(12) United States Patent
Reichelt

(10) Patent No.: US 8,514,272 B2
(45) Date of Patent: Aug. 20, 2013

(54) DIRECTIONAL ILLUMINATION UNIT FOR AUTOSTEREOSCOPIC DISPLAYS

(75) Inventor: Stephan Reichelt, Dresden (DE)

(73) Assignee: Seereal Technologies S.A., Munsbach (LU)

( * ) Notice: Subject to any disclaimer, the term of this patent is extended or adjusted under 35 U.S.C. 154(b) by 429 days.

(21) Appl. No.: 12/601,107

(22) PCT Filed: May 23, 2008

(86) PCT No.: PCT/EP2008/056358
§ 371 (c)(1),
(2), (4) Date: Nov. 20, 2009

(87) PCT Pub. No.: WO2008/142156
PCT Pub. Date: Nov. 27, 2008

(65) Prior Publication Data
US 2010/0157026 A1    Jun. 24, 2010

(30) Foreign Application Priority Data

May 24, 2007 (DE) .......................... 10 2007 026 071

(51) Int. Cl.
*H04N 13/04* (2006.01)
(52) U.S. Cl.
USPC ........ 348/51; 348/13.075; 359/462; 359/463; 359/464; 428/172; 345/205
(58) Field of Classification Search
USPC ................. 348/51; 359/462, 463, 464; 345/6
See application file for complete search history.

(56) References Cited

U.S. PATENT DOCUMENTS

| 7,688,509 B2 * | 3/2010 | Vissenberg et al. ........... 359/463 |
| 2006/0110580 A1 * | 5/2006 | Aylward et al. ............... 428/172 |
| 2006/0250671 A1 | 11/2006 | Schwerdtner et al. |
| 2010/0277446 A1 * | 11/2010 | van Veenendaal et al. ... 345/205 |

FOREIGN PATENT DOCUMENTS

| DE | 10 2005 012 348 | 7/2006 |
| WO | WO 2004/075526 | 9/2004 |
| WO | WO 2004/099847 | 11/2004 |
| WO | WO 2005/060270 | 6/2005 |

OTHER PUBLICATIONS

International Search Report, dated Nov. 14, 2008, issued in priority International Application No. PCT/EP2008/056358.
Smith et al., "Agile wide-angle beam steering with electrowetting microprisms," Optics Express, vol. 14, No. 14, pp. 6557-6563 (Jul. 10, 2006) XP002497446.

* cited by examiner

*Primary Examiner* — Kyung H Shin
(74) *Attorney, Agent, or Firm* — Saul Ewing LLP

(57) ABSTRACT

A directionally controlled illumination unit is disclosed that deflects light from activated illumination elements into visibility regions by a transmissive image reproduction means. The visibility regions are tracked by the eyes of different viewers to other positions in front of the display via a tracking unit and image control. To avoid a strong correlation of one pixel of the image reproduction means to a deflection element (electro-wetting cell) of a deflection means, the directionally controlled illumination unit comprises a two-dimensional illumination means in front of the image reproduction means arranged in a serial manner in the optical path and a deflection means containing at least one field having an arrangement of electro-wetting cells that can be discretely addressed in groups and adjusted with regard to their refractive behavior by the tracking unit and image control.

9 Claims, 2 Drawing Sheets

DIRECTIONAL ILLUMINATION UNIT FOR AUTOSTEREOSCOPIC DISPLAYS

CROSS REFERENCE TO RELATED APPLICATIONS

This application claims the priority of PCT/EP2008/056358, filed on May 23, 2008, which claims priority to German Application No. 10 2007 026071.9, filed May 24, 2007, the entire contents of which are hereby incorporated in total by reference.

BACKGROUND OF THE INVENTION

The invention relates to a directional illumination unit for autostereoscopic displays, which directs light which is emitted by activated illumination elements through a transmission-type image display means at visibility regions in the space in front of the display. After modulation of the light with image information and other information in the image display means, observer eyes can see a stereoscopic and/or monoscopic presentation.

The field of application of this invention includes autostereoscopic displays where the visibility regions can be tracked automatically to the eyes of multiple observers when they move to different positions in a relatively large viewing space in front of the display with the help of a tracking device and image controller. According to this invention, the images and other information can be provided to the observers optionally in a two-dimensional, in a three-dimensional or in a mixed mode.

An example of an autostereoscopic display with a directional illumination unit has been described by the applicant in the hitherto unpublished document DE 10 2006 042 325. Other special embodiments of such displays for sequential presentation of stereo images in synchronism with the formation of a visibility region for each observer eye have already been described in other applications and patents which are concerned with autostereoscopic displays and which have been filed by the applicant.

Seen in the direction of light propagation, the directional illumination unit of the autostereoscopic display according to this document comprises an illumination means with illumination elements which emit or transmit light, and an imaging means with imaging elements. The imaging elements image the light of activated illumination elements of the illumination means in almost parallel bundles of rays always onto one observer eye, where they form a visibility region. Each imaging element images a multitude of activated illumination elements, because the number of the regularly arranged illumination elements is larger by multiples than the number of the regularly arranged imaging elements.

For autostereoscopic presentation of images or other information there is the requirement that the entire area of both the visibility region and image display means must always be illuminated homogeneously in order to realise a high-quality 3D presentation. Further, cross-talking of the stereo images to the respective other eye shall be avoided.

The visibility region can be defined in various ways, and it can be large enough to serve either one or both eyes of an observer. Even if the observer moves to a new position in the viewing space in front of the display, they must be continuously provided with high-quality monoscopic and/or stereoscopic images.

If in an autostereoscopic display of the above-described type a stereoscopic representation is realised for two observers, for example, four visibility regions must be provided to serve the four different eye positions. In doing so, a number of problems must be solved in order to achieve a good imaging quality for a large number of observers.

First and foremost, in the interest of an acceptable user convenience, the visibility regions for the two eyes of one observer must be provided somewhat distant to the visibility regions for the two eyes of another observer, so to circumvent mutual interfering of the observers in front of the autostereoscopic display. However, the optical imaging conditions for an observer are optimal when their eyes are situated in a central position in front of the display, i.e. near its optical axis.

As the lateral distance of the observer eyes from the centre of the display becomes larger, the image quality deteriorates because the emission angles of the bundles of rays become larger. If a lenticular is used as an imaging means, for example, optical aberrations will occur which may impede the creation of sufficiently large defined visibility regions. Further, the aberrations do not allow large viewing angles, so that the light beams do not reach an observer who is situated too far away from the central axis of the display. The viewing angle or viewing space is here defined as a space or range in front of the display, seen from the observer's perspective, where observers can be situated and watch a presentation in the desired mode. However, a large viewing angle is essential in particular for a multi-use display. The above-mentioned disadvantages can be circumvented by using a controllable deflection unit.

A controllable electro-optical cell, a so-called electrowetting cell, is known from the international publication WO 2004/099847. These cells take advantage of the capillary effect and electrowetting effect in order to modify the surface tension of liquids using electrostatic potential and so to control the optical refraction behaviour. An electrowetting cell basically comprises a capacitor which is filled between the electrodes with a hydrophobic liquid, such as an oil, and water, where one of the electrodes is coated with a hydrophobic material. Without an electric field being applied, the oil covers the coated electrode as a film, and with an electric field being applied, the water displaces the oil film, because the applied field compensates the polarisation of the dipoles in the water surface. There is an interface between the two materials. The cell can be controlled electronically to realise optical lenses and prism elements with a surface area of less than one square millimeter.

Due to the variable control of the inclination of the interface in an electrowetting cell, the optical refraction behaviour can be changed continuously, which is why optical aberrations can be reduced much better than with conventional optical elements. Thanks to these properties, electrowetting cells are optimally suited for usage in devices which realise optical and wave-optical functions.

An autostereoscopic display device according to the international publication WO 2004/075526 A2 takes advantage of such an electrowetting cell. In that display, collimated light is transmitted through a flat display means with discrete pixels, which generates stereoscopic video images for each observer eye which differ in parallax.

The flat display means comprises a beam splitter and a dynamically controllable beam controller with electrowetting cells in order to direct the video images at the respective eye of observers. In the controllable beam controller, each modulator pixel of the display means is fixedly assigned to an electrowetting cell, so to adjust the light exit angle of the light beams whose intensity has been modified such that it is directed at the current eye position. The fixed assignment of the electrowetting cells and the pixels of the flat display panel requires great technological effort in particular as regards the manufacturing precision. That system is designed for pointwise modification of incoherent light and makes no demands whatsoever on interference conditions. In particular the non-linear transmission behaviour in the marginal zones of the electrowetting cells would affect the propagation of the modulated light and thus reduce the quality of the 3D representation if electrowetting cells and pixels are insufficiently aligned.

This invention shall widely overcome the disadvantages described in the prior art section.

It is therefore the object of the present invention to provide for light guidance in an above-described autostereoscopic display with simple optical means a directional illumination unit which allows multiple observers to watch a 2D and/or 3D presentation without any disturbance simultaneously from respectively assigned visibility regions in a viewing space in front of the display. The space in front of the display which is accessible for a tracking and image controller shall therefore be relatively large. The directional illumination unit according to this application shall transmit the light which is emitted by the illumination means into the visibility region widely loss-free and homogeneous.

Further, an assignment of an electrowetting cell to a pixel of the fine pixel structure of the image display means shall be avoided. Further, it shall be avoided that the directional illumination unit adversely affects the light which modulated by the image display means during its further propagation. Further, an improved image quality of the autostereoscopic display shall be achieved at the same time compared with prior art devices thanks to the arrangement of the optical means.

SUMMARY OF THE INVENTION

The present invention is based on a directional illumination unit which is controlled by a tracking and image controller and which alternately images modulated bundles of rays to at least one observer, whose eyes can be in various positions in relation to the image display means, in the form of visibility regions with an extent that is similar to the size of an eye pupil, where the image display means, which have a pixelated structure, modulate the bundles of rays with sequences of stereoscopic images.

According to the characterising features of this invention, the directional illumination unit comprises surface-emitting illumination means which are serially arranged before the image display means, seen in the direction of light propagation, which provide homogeneous light for the pixel structure of the image display means, and deflection means, which comprise at least one array of electrowetting cells, where the deflection means are discretely addressable at least in groups by the tracking and image controller, and where their optical refraction behaviour is controllable, and where they realise at least a controllable prism function in order to adapt the exit direction of the bundles of rays sequentially and in synchronism with the alternately modulated bundles of rays such that they are directed at the eye position which corresponds with the currently modulated stereoscopic image, and where they realise an additional controllable lens function in order to adapt the visibility regions depending on the distance of the observer eyes to the image display means.

Such an optical arrangement has the advantage that the geometry of the deflection means, in particular the number of the electrowetting cells and their pitch can be chosen freely and independently of the pixel structure of the image display means. As the surface area of the electrowetting cells is larger than that of the pixels, an exactly congruent arrangement of the cell edges and pixel edges is preferably not necessary. The surface area here is the area of a plane cross-section through the component at right angles to the beam path.

The surface-emitting illumination means can be made inexpensively in the form of homogeneous surface-emitting diodes. Such surface-emitting diodes are known in many variations in display technology and are used as so-called backlights.

In another embodiment, the illumination means can be an array of point- or line-shaped illumination elements, and the imaging means image the bundles of rays which are emitted by the illumination elements in a collimated manner to at least one group of deflection means. The imaging means comprise at least one array of imaging elements. Always one imaging element, e.g. in the form of rod-shaped cylindrical lenses, is assigned to a certain number of illumination elements for collimating the emitted bundles of rays.

Since the illumination unit is disposed before the image display means in the optical path, neither the pitch of the imaging means not the pitch of an array of deflection means must correspond with its pixel pitch.

In order to be able to adjust the extent of the visibility regions, the imaging means, which are preferably disposed before the deflection means in the optical path, preferably have a pixelated structure of imaging elements. Each imaging element is assigned with a freely selectable number of deflection elements in the form of a group or array of electrowetting cells. In order to make it easier for the computing means of the tracking and image controller to compute and address the electrowetting cells, all electrowetting cells which are assigned to one imaging element can be treated, addressed and controlled as one single imaging element. The imaging element and the assigned electrowetting cells form a functional optical unit.

In a preferred embodiment of the invention, multiple electrowetting cells are stacked in the direction of light propagation. On the one hand, they can serve as achromatic lenses for colour compensation, in that the optical materials of the deflection elements which are connected in series exhibit different dispersion behaviour. On the other hand, at least two cells, which are designed for one-dimensional prism movement only, can be stacked on top of each other at right angles. This way, control and deflection of bundles of rays can be realised in two dimensions at the same time (X, Y). This would make it possible for multiple observers who sit and stand in front of the display to watch the displayed presentation.

In another embodiment of the electrowetting cell it is provided that at least two different, immiscible materials are included in an electrowetting cell, which exhibit at least one common interface. The use of one interface simplifies the design of an array of electrowetting cells. However, if two interfaces are used, stacking of the electrowetting cells becomes superfluous when they have an electrode arrangement which provides for two-dimensional deflection of the bundles of rays.

The advantages of the invention are that visibility regions are generated which are characterised by great brightness, great contrast and little mutual cross-talking in a larger viewing space in front of the autostereoscopic display with the described embodiments of the optical means and their combination compared to the prior art described above, and that a homogeneous illumination of the image display means is thus achieved.

Further, watching monoscopic and/or stereoscopic presentations from multiple visibility regions which are assigned to multiple observers is possible without any mutual disturbance among the observers. This allows free and independent mobility of the individual observers in an extended viewing space, which means at the same time that the tracking range is enlarged.

The invention improves in a simple manner the homogeneity of the light distribution both across the image display means and in the visibility regions in that the directional illumination unit supplies the deflection means with a largely directed surface-emitting illumination and the tracking and image controller directs this illumination with the help of the electronically controllable electrowetting cells, which are known as such, into the visibility regions.

Further advantages are that the transmittance and thus the image quality of the autostereoscopic display can be improved and the efforts put in the optical means can be reduced compared with the prior art.

BRIEF DESCRIPTION OF THE DRAWINGS

The invention is described in more detail below with the help of drawings wherein.

DETAILED DESCRIPTION

Figure 1:
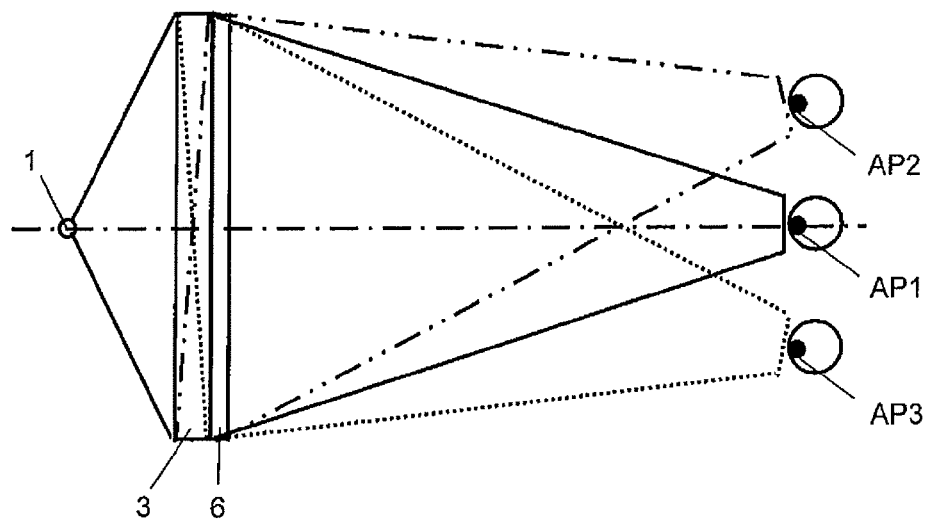
FIG. 1 is a top view showing a general design of an autostereoscopic direct-view display with an directional illumination unit according to this invention.

FIG. 1 only shows the principal components of the general design of an autostereoscopic display, preferably a direct-view display, with a directional illumination unit according to this invention for realising a prism function. The light propagates from surface-emitting illumination means 1, here shown as a single light source only, through an array of deflection means 3 and subsequent image display means 6 towards eye positions AP1 to AP3. There, the individual bundles of rays form a visibility region. At the shown moment, three right eyes are situated in three visibility regions, and right stereo images are displayed for them on the image display means 6. The right and left stereo images change sequentially, so that the observers simultaneously see a three-dimensional (3D) presentation, where the content of the 3D presentation can be the same or different for the individual observers. If different contents are presented, they will be provided sequentially to the individual observers. FIG. 1 can alternatively be interpreted such that one observer takes three different positions in front of the image display means 6 one after another, and that the visibility region is tracked to their respective eye positions AP1 to AP3.

The tracking and image controller 10 which is used for tracking the visibility regions (see FIG. 2) is connected to a position detection system (not shown) for three-dimensionally detecting the current observer position.

Figure 2:
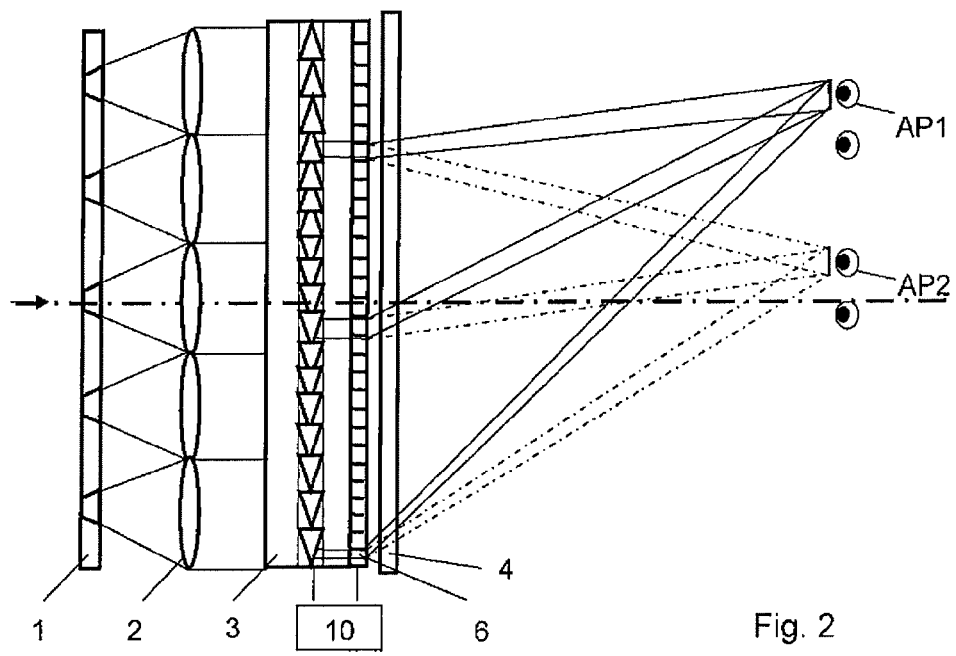
FIG. 2 is a top view showing an embodiment of a display according to FIG. 1 for two observers.

FIG. 2 shows the directional illumination unit for two observers. The main components are shown schematically one after another, seen in the direction of light propagation: illumination means 1, imaging means 2, deflection means 3, transmission-type image display means 6, a field lens 4, a tracking and image controller 10, and two eye positions AP1 and AP2. The latter define those positions of observer eyes in front of the display for which a visibility region is being generated at that moment.

The surface-emitting illumination means 1 can be homogeneous surface-emitting diodes, and they are disposed about in the front focal plane of the imaging means 2. The optical path is indicated by an arrow on the optical axis 8.

The imaging elements of the imaging means 2 can include spherical or aspherical lenses, holographic optical elements (HOE) or diffractive optical elements (DOE). The illumination means can also be an array of point- or line-shaped illumination elements.

The imaging means 2, which have the form of rod-shaped cylindrical lenses in FIG. 2, image with at least one array of imaging elements the bundles of rays which are emitted by activated illumination elements discretely to at least one group or array of deflection means 3 in a collimated manner. Each imaging element of the imaging means 2 is assigned with multiple electrowetting cells of the deflection means 3. The bundles of rays which serve one observer eye are sequentially superimposed in the visibility region. As they pass the image display means 6, they are synchronously modulated with separate image sequences, so that an observer can watch from the visibility region a presentation in the selected 2D or 3D or mixed mode. This process is controlled by the tracking and image controller 10. The tracking and image controller 10 treats, addresses and tracks all electrowetting cells which are assigned to one imaging element according to the beam path as one single deflection element.

This way, always one imaging element and the assigned electrowetting cells form a functional optical unit. Because both observers are situated at about the same distance to the display, only the prism function is activated in the electrowetting cells in order to realise the necessary deflection of the bundles of rays to the eye positions AP1 and AP2. The prisms are only shown schematically with one angle in this figure. In reality, adjacent cells are controlled differently, and can thus realise different deflection angles. The one-dimensional deflection in the array has the advantage that only low demands must be made on the electrodes and controllers in contrast to a two-dimensional design of electrowetting cells.

The imaging means 2 can additionally be followed by a field lens 4 in order to improve the assignment of the bundles of rays to the visibility region.

In another embodiment, the prism function can also be realised in two dimensions, in that an arrangement of electrodes is designed for a two-dimensional control of the interface between two materials. It is further possible to combine materials in a cell such that there are two interfaces. They can realise a two-dimensional deflection of the bundles of rays in that they are inclined in mutually different directions when being addressed. Prism functions and lens functions can then be realised in both directions.

Figure 3A:
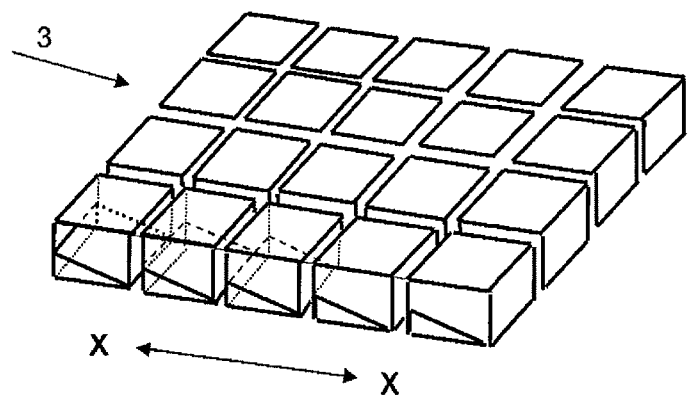
FIGS. 3a, 3b show embodiments of arrays of electrowetting cells for one- or two-dimensional deflection of bundles of rays.
Figure 3B:
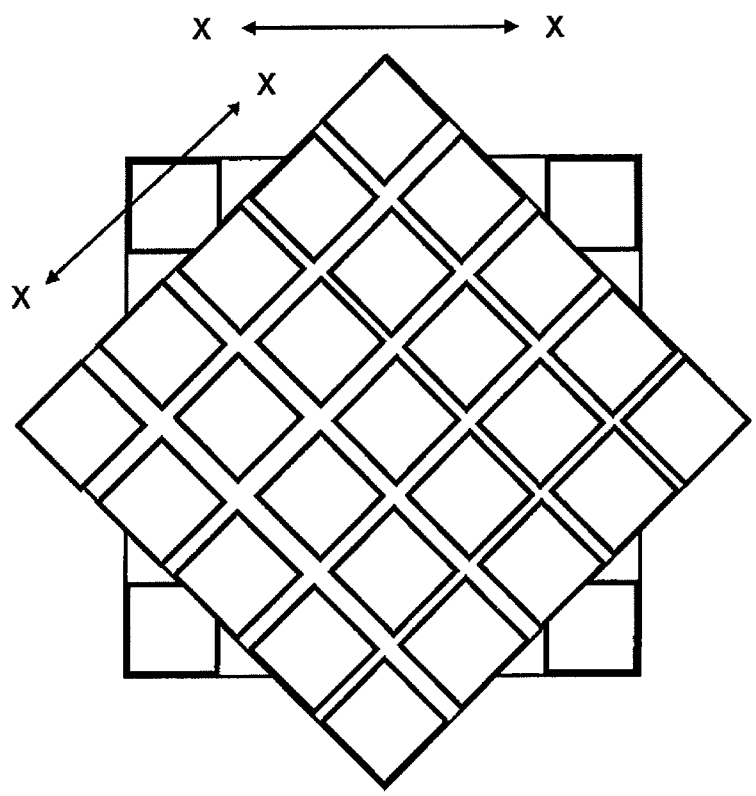

FIGS. 3a and 3b show arrays of deflection means 3 for different applications in a simplified drawing.

The array in FIG. 3a is shown in a perspective view. It comprises as deflection means 3 a multitude of regularly arranged, square electrowetting cells, of which only a few are shown in the drawing. The depiction of the electrodes and controller means is omitted. The individual electrowetting cells of known design preferably comprise at least two different, immiscible materials, between which an interface can be variably controlled. Referring to FIG. 3a, the interface in a cell can be addressed and controlled such that it is inclined as a plane surface, thus only realising a prism function for incident bundles of rays in one direction, here in the X direction. The X direction corresponds to a lateral deflection angle in front of the autostereoscopic display. The inclined interface is only shown in three cells to maintain a certain clarity of the drawing. Further, the interface can generally be deformed such that it is curved when being addressed, thus realising a lens function in one dimension. By way of controlling the individual electrowetting cells, the interfaces are inclined depending on the actually detected eye position AP1, AP2 or AP3 (see FIG. 2) at an angle which laterally deflects the bundles of rays one-dimensionally towards the detected eye position, where they are superimposed.

In addition, the interface can be deformed by controlling respectively assigned electrodes. This deformation serves to adapt the distance between the visibility region to be generated to the display panel for an observer. Thanks to this combination of prism function and lens function, a large deflection angle and, consequently, viewing range can be realised in one dimension, i.e. in the X direction, for multiple observers who are situated at different distances to the display. According to this invention, the deflection means are always only addressed and controlled discretely in groups, and they are only assigned to certain arrays of imaging means and of image display means. This has the advantage that the geometry of the deflection means, in particular the number of the electrowetting cells and their pitch can be chosen freely and independently of the pixel structure of the image display means.

In order to be able to realise the prism and lens function in two dimensions, i.e. also for the Y direction, two one-dimensionally deflecting arrays of deflection means of same design can preferably be stacked. The second array is then disposed turned at right angles to the first array. Each array then functions in its working direction as described for FIG. 3a.

The arrays can serve as achromatic lenses for colour compensation, in that the optical materials of the electrowetting cells of the deflection elements which are connected in series exhibit different dispersion behaviour because of their different wavelength-specific refractive indices.

A further embodiment of the stacked arrangement is shown schematically as a top view in FIG. 3b. Two one-dimensionally controllable arrays have the same general design and are stacked at an angle of 45°. This arrangement allows to enlarge the deflection range in at least one selected direction, here the X direction, by a definable angular range. The arrays do not have to be of square design, as shown in FIG. 3b, but can have any polygonal shape. The same applies to the shape of the electrowetting cells, which should, however, preferably be identical in stacked arrays.

A comparison of the shapes of the pixel structure of the image display means with the structure of the electrowetting cells is not necessary, because there is no assignment between individual electrowetting cells and individual pixels of the fine pixel structure of the image display means in the arrangement of optical components according to this invention. An electrowetting cell is here always larger than a pixel. This is the major advantage of the invention compared with prior art devices.

If the deflection means are disposed after the image display means, seen in the direction of light propagation, the electrowetting cell and the pixels must have about the same size and be aligned precisely. Only then would an image quality be achieved for multiple observers which is sufficiently high. If the mentioned elements do not have the same size, additional correction means, either in optical and electronic form, will become necessary to improve the image quality. These disadvantages are overcome with the present invention.

If the invention is applied in an autostereoscopic display which is designed as imaging system, the image display means is the display screen.

The invention claimed is:

1. Directional illumination unit for an autostereoscopic display, where the illumination unit comprises a surface-emitting illumination means and an imaging means, and which is controlled by a tracking and image controller and which alternately images modulated bundles of rays to at least one observer, whose eyes can be in various positions in relation to the image display means, in the form of visibility regions with an extent that is similar to the size of an eye pupil, where the image display means, which have a pixel structure, modulate the bundles of rays which are emitted by the illumination unit with sequences of stereoscopic images, comprising:
deflection means being disposed in front of the image display means on the optical path with respect to the propagation of light of the illumination unit,
which comprise at least one array of electrowetting cells, the size of the electrowetting cells being larger than the size of the pixels,
which can be addressed discretely at least in groups by the tracking and image controller and where their optical refraction behaviour is controllable, and
where they realise at least a controllable prism function in order to adapt the exit direction of the bundles of rays sequentially and in synchronism with the alternately modulated bundles of rays such that they are directed at the eye position which corresponds with the currently modulated stereoscopic image, and where they realise an additional controllable lens function in order to adapt the visibility regions depending on the distance of the observer eyes to the image display means.

2. Directional illumination unit according to claim 1, wherein the deflection elements comprise stacked electrowetting cells.

3. Directional illumination unit according to claim 2, wherein on electrowetting cells which only realise prism angles for control in one dimension (X) always a second electrowetting cell of the same type is disposed at a right angle to realise a control in a second dimension (Y).

4. Directional illumination unit according to claim 2, wherein the stacked electrowetting cells exhibit different wavelength-specific refractive indices in order to realise a chromatic correction for colour representations, analogously to an achromatic lens.

5. Directional illumination unit according to claim 1, wherein the illumination means are homogeneous surface-emitting diodes.

6. Directional illumination unit according to claim 1, wherein the illumination means are an array of point- or line-shaped illumination elements, and where the imaging means with at least one array of imaging elements image the bundles of rays which are emitted by the illumination elements in a collimated manner to at least one group of deflection means.

7. Directional illumination unit according to claim 2, wherein each imaging element of the imaging means is assigned with multiple electrowetting cells of the deflection means, and where the tracking and image controller treats, addresses and controls all electrowetting cells which are assigned to one imaging element like a single deflection element.

8. Directional illumination unit according to claim 7, wherein always one imaging element and the assigned electrowetting cells form a functional optical unit.

9. Directional illumination unit according to claim 1, wherein the imaging means are additionally combined with a field lens.

* * * * *